June 26, 1962 M. TOURNAIRE 3,040,611
GUILLOTINE SHEARS
Filed Nov. 15, 1956

INVENTOR
MARCEL TOURNAIRE
BY Paul M. Craig, Jr.
ATTORNEY.

3,040,611
GUILLOTINE SHEARS
Marcel Tournaire, Paris, France, assignor to Compagnie Generale du Duralumin et du Cuivre, Paris, France, a corporation of France
Filed Nov. 15, 1956, Ser. No. 714,935
5 Claims. (Cl. 83—636)

It is known at the present time that metal tubes are cut transversely at right angles or obliquely either by sewing, or by using circular shears, or by using guillotine shears.

The use of guillotine shears with conventional cutting tools has the disadvantage that partial crushing of the tube near the cutting-place is occasioned, thereby causing a slight fold to occur near the end of the cut tube.

The presence of this slight fold narrows the free opening of the tube and impedes the introduction of balls during mounting on mandrel rods in cases where the two tube sections are to be subsequently drawn.

This disadvantage can be overcome by using the sawing method, but this leaves saw cuttings adhering, and these are detrimental to any subsequent drawing.

The present invention has as an object the prevention of deformation of the tube when the latter is being cut on guillotine shears, guillotine cutting itself having the advantage that no saw cuttings are left.

The invention consists of a cutting tool for use in shearing tubes on guillotine shears, characterised in that the shearing member is in the form of two half V's which are joined together but with their points offset relatively to each other.

Preferably the points are offset by a distance at least equal to the wall thickness of the tube which is to be sheared.

The invention will be further described with reference to the accompanying drawings wherein.

Figures 1, 2:
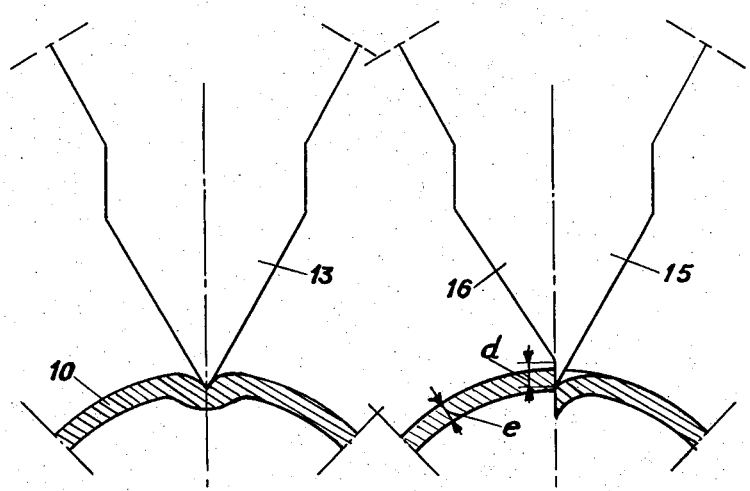
FIGURES 1 and 2 show respectively a conventional cutting tool and a cutting tool according to the invention, and their effect on a tube at the point of cutting.
Figure 3:
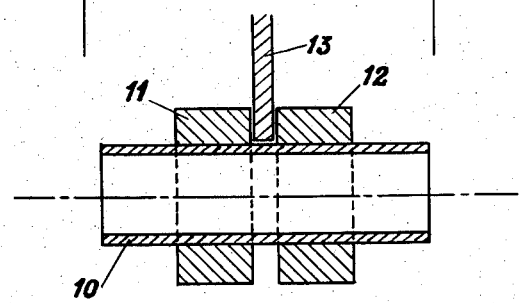
FIGURE 3 shows the means of holding the tube to be cut.

In using guillotine shears, and as illustrated in FIGURE 3 of the accompanying drawings, the tube 10 to be sheared is held at each side of the cut by two jaws 11 and 12; the conventional shearing member 13 of the guillotine is double-edged and is V-shaped, as shown in FIGURE 1.

Figures 4, 5:
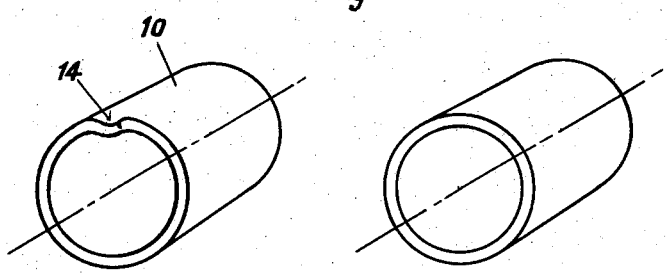
FIGURES 4 and 5 show lengths of tube cut by old and new tools respectively.

During the shearing operation, partial crushing of the tube is produced at the place of cutting; the deformation, which is more or less considerable depending on the degree to which the tube has been cold-rolled, exceeds the yield point and persists after the tube has been cut into sections, see FIGURE 4 where the deformation is shown at 14.

A tool according to the invention is shown in a front view in FIGURE 2 of the accompanying drawings; the shearing member is constituted by two half-V's 15 and 16 which are joined together but form, of course, only one unitary piece. The distance separating the two points of the half-V's is slightly greater than the wall thickness $e$ of the tube.

The method of operation and the advantage of a tool thus designed will be readily apparent: operating in the same way (FIG. 3) and with the same force as with the kind of shearing member usually employed in guillotine shears, the more advanced half-V 15 penetrates with a pressure which is more localised, and therefore more intense, and the cutting is severed without buckling the tube, as will be noted; once the portion of the tube at the right-hand side of FIGURE 2 has been cut away, and no longer offers any resistance, the cutting edge of the half-V 16 then comes into action, attacking the left-hand portion of the tube.

From this instant, the novel tool profile has fulfilled its function; of preventing permanent deformation of the tube, and the shearing member continues to act in the same way as a conventional tool during the rest of the cutting operation to cut the tube. Each cut length of tube then has, at the place where it is cut, the regular shape illustrated in FIGURE 5.

Various modifications may be made within the scope of the invention.

What I claim is:

1. A cutting tool made of flat stock particularly for use with a guillotine-type shearing machine for cutting tubes in a direction perpendicular to the axis thereof, said cutting tool being provided with a cutting edge disposed transversely to the body of the tool, said tool having three cutting surfaces, a first cutting surface extending away from said cutting edge and being disposed, at the time of the shearing action, in the radial plane of the tube containing said cutting edge, and two other cutting surfaces disposed on opposite sides of said first cutting surface, each of said other cutting surfaces forming an angle with said first cutting surface, one of said other cutting surfaces joining said first cutting surface at said cutting edge and diverging toward the rear of said cutting tool from said cutting edge and the second of said other cutting surfaces joining said first cutting surface at the back edge thereof and diverging toward the rear of said cutting tool from said back edge of the first cutting surface.

2. A cutting tool made of flat stock particularly for use with a guillotine-type shearing machine for cutting tubes in a direction perpendicular to the axis thereof, said cutting tool being provided with a cutting edge disposed parallel to the axis of the tube and comprising a first cutting surface extending toward the rear of said cutting tool from said cutting edge in a direction such as to form an acute angle with a radial plane of the tube including said cutting edge, a second surface joining said first surface at said cutting edge and extending from said cutting edge in said radial plane, a third cutting surface joining said second surface on the side opposite said first surface and at a distance from said cutting edge and extending toward the rear of said cutting tool in a direction such as to form an acute angle with said radial plane.

3. A cutting tool according to claim 1, wherein said angles formed with said two other surfaces are equal.

4. A cutting tool according to claim 1, wherein the length of said first cutting surface is at least equal to the thickness of the tube.

5. A cutting tool according to claim 1, wherein the cross section of said tool in a plane parallel to the axis of said tube is rectangular in shape.

References Cited in the file of this patent

UNITED STATES PATENTS

| | | |
|---|---|---|
| 284,496 | Seymour | Sept. 4, 1883 |
| 2,555,069 | Verney | May 29, 1951 |
| 2,884,063 | Stover | Apr. 28, 1959 |

FOREIGN PATENTS

| | | |
|---|---|---|
| 30,663 | France | Apr. 27, 1926 |
| 837,036 | Germany | June 23, 1952 |